US008695102B2

(12) United States Patent  
Bade et al.

(10) Patent No.: US 8,695,102 B2  
(45) Date of Patent: Apr. 8, 2014

(54) CONTROLLING EXECUTION OF EXECUTABLES BETWEEN PARTITIONS IN A MULTI-PARTITIONED DATA PROCESSING SYSTEM

(75) Inventors: Steven A. Bade, Georgetown, TX (US); Renato J. Recio, Austin, TX (US); Madeline Vega, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2546 days.

(21) Appl. No.: 11/380,951

(22) Filed: May 1, 2006

(65) Prior Publication Data

US 2007/0261123 A1     Nov. 8, 2007

(51) Int. Cl.  
*G06F 21/00* (2013.01)

(52) U.S. Cl.  
USPC ............... 726/27; 726/26; 726/28; 726/29; 726/30

(58) Field of Classification Search  
USPC ........ 726/27, 26, 28, 29, 30; 711/1, 200, 207; 713/151, 2; 717/121, 130  
See application file for complete search history.

(56) References Cited

U.S. PATENT DOCUMENTS

| | | | |
|---|---|---|---|
| 5,628,023 A * | 5/1997 | Bryant et al. | 711/207 |
| 6,968,540 B2 | 11/2005 | Beck et al. | |
| 7,069,432 B1 * | 6/2006 | Tighe et al. | 713/151 |
| 7,111,292 B2 | 9/2006 | Bonnett et al. | |
| 7,370,319 B2 | 5/2008 | Pensak et al. | |
| 7,509,639 B2 | 3/2009 | Worley, Jr. | |
| 7,509,644 B2 | 3/2009 | Worley, Jr. | |
| 7,536,558 B2 | 5/2009 | Neble et al. | |
| 7,603,665 B2 | 10/2009 | Taivalsaari et al. | |
| 2002/0049963 A1 * | 4/2002 | Beck et al. | 717/130 |
| 2003/0051090 A1 * | 3/2003 | Bonnett et al. | 711/1 |
| 2004/0177243 A1 * | 9/2004 | Worley, Jr. | 713/2 |
| 2004/0177342 A1 * | 9/2004 | Worley, Jr. | 717/121 |
| 2004/0181772 A1 | 9/2004 | Pensak et al. | |
| 2005/0086419 A1 | 4/2005 | Neble et al. | |
| 2005/0289285 A1 * | 12/2005 | Taivalsaari et al. | 711/1 |
| 2006/0036830 A1 * | 2/2006 | Dinechin et al. | 711/200 |
| 2007/0006218 A1 * | 1/2007 | Vinberg et al. | 717/174 |

FOREIGN PATENT DOCUMENTS

| | | |
|---|---|---|
| JP | S59058545 A | 4/1984 |
| JP | S63128434 A | 6/1988 |
| JP | H0289119 A | 3/1990 |
| JP | H11338749 A | 12/1999 |
| JP | 2003150393 A | 5/2003 |
| JP | 2004096755 A | 3/2004 |
| JP | 2005527011 A | 9/2005 |
| JP | 2005284902 A | 10/2005 |
| JP | 2005293283 A | 10/2005 |
| WO | WO 2004/068426 A1 | 8/2004 |

OTHER PUBLICATIONS

"AIX 5L Version 5.2: Performance Management Guide," International Business Machines Corporation, Oct. 2002, 7 pages. (English translation and original Japanese-language document).

(Continued)

*Primary Examiner* — Bradley Holder  
(74) *Attorney, Agent, or Firm* — Yee & Associates, P.C.; Parashos Kalaitzis (57) ABSTRACT

A computer implemented method, apparatus, and computer usable program code for assuring data integrity is shown. A partition receives a request to execute an executable file from a source external to the partition. A memory region is created within the partition. The partition or service interface makes an authentication determination. The partition executes an executable file in the memory region based on the request, provided there is a positive authentication determination.

6 Claims, 4 Drawing Sheets

(56) References Cited

OTHER PUBLICATIONS

Ohta et al., "Trusted Device Framework for Secure Handset Functionality Extension," IPSJ SIG Technical Reports, vol. 2005, No. 16(OS-98), Feb. 2005, pp. 49-56. (English abstract only).

"z/OS Cryptographic Services Integrated Cryptographic Service Facility Overview," International Business Machines Corporation, Feb. 2004, 34 pages. (English translation and original Japanese-language document).

\* cited by examiner

CONTROLLING EXECUTION OF EXECUTABLES BETWEEN PARTITIONS IN A MULTI-PARTITIONED DATA PROCESSING SYSTEM

BACKGROUND OF THE INVENTION

1. Field of the Invention

The present invention relates generally to data integrity. More specifically, the invention relates to a computer implemented method, apparatus, and computer usable program code for preventing the copying of secured code or the rewriting of secured code.

2. Description of the Related Art

Increasingly large symmetric multi-processor data processing systems, such as IBM eServer™ P690, available from International Business Machines Corporation, DHP9000 Superdome Enterprise Server, available from Hewlett-Packard Company, and the Sunfire™ 15K server, available from Sun Microsystems, Inc., are not being used as single large data processing systems. The data processing systems are the trademarked names of the respective companies. Often, operators partition this type of a data processing system to form a number of logical systems. These logical systems are known as logical partitioned (LPAR) data processing systems. Many data processing systems allow multiple copies of a single operating system or multiple heterogeneous operating systems to be run simultaneously on a single data processing system platform when used with a logical partitioning functionality. A partition manager allocates a non-overlapping subset of the platform's resources to a partition, within which an operating system image runs. These platform allocatable resources include one or more architecturally distinct processors with their interrupt management area, regions of system memory, and input/output (I/O) adapter bus slots. The platform's firmware represents the partition's resources to the operating system image.

Each distinct operating system or image of an operating system running within a platform is protected from each other such that software errors on one logical partition cannot affect the correct operations of any of the other partitions. Firmware protects by allocating a disjointed set of platform resources to be directly managed by each operating system image. Firmware also protects by providing mechanisms for insuring that the various images cannot control any resources not allocated to that image. Furthermore, firmware prevents software errors of an operating system from affecting the resources of any other image. Thus, each image of the operating system or each different operating system directly controls a distinct set of allocatable resources within the platform.

With respect to hardware resources in a logical partitioned data processing system, these resources are disjointly shared among various partitions. These resources may include, for example, input/output (I/O) adapters, memory dual in-line memory modules (DIMMs), non-volatile random access memory (NVRAM), and hard disk drives. Each partition within an LPAR data processing system may be booted and shut down over and over without having to power-cycle the entire data processing system. A partition is a subset of data processing system hardware resources allocated to an operating system wherein there is no overlap in resources allocated to two partitions. A partition manager may allocate memory between two partitions from a common memory chip. This allocation results in preventing an overlap of the ranges of physical memory addresses directly accessible to each partition. One partition may indirectly control memory of a second partition, but only by commanding a process of the second partition to directly operate on the memory.

Commercial software developers require protections to copies of software or code they develop. In the first instance, it would be helpful to prevent the unauthorized copying of the software in order to couple the benefits of software with its costs. In the second instance, it would be helpful to diminish external forces that corrupt the code by making unauthorized writes to memory allocated to the software.

SUMMARY OF THE INVENTION

The present invention provides a computer implemented method, apparatus and computer usable program code for executing an executable file by receiving a request to execute the executable file from an entity running within a source partition. A service interface creates a memory region within a target partition in response to receiving the request. The service interface makes an authentication determination. The service interface executes the executable file in the memory region based on the request provided the authentication determination is positive.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
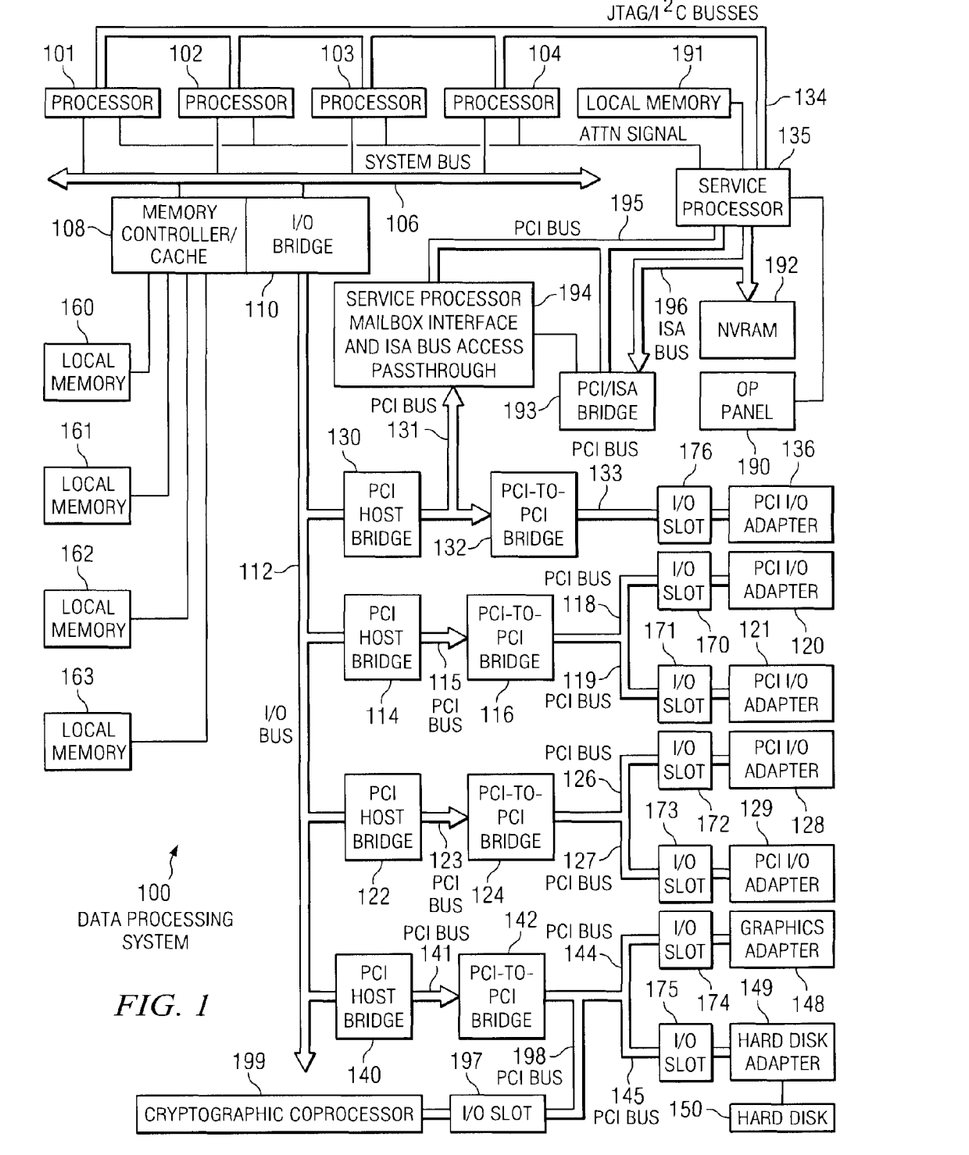
FIG. 1 is a block diagram of a data processing system in which the present invention may be implemented.

FIG. 1 shows a block diagram of a data processing system in which the present invention may be implemented. Data processing system 100 may be a symmetric multiprocessor (SMP) system including a plurality of processors 101, 102, 103, and 104, which connect to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems or multiple instances of a single operating system running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of processors 101-104, and memory from local memories 160-163 is assigned to each of the three partitions. In these examples, local memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, cryptographic coprocessor 199, and I/O adapters 120, 128, and 129 may be assigned to logical partition P1. A cryptographic coprocessor is a processor that includes circuits that protect against physical tampering, as well as protects against adding malicious software. It is appreciated that no method is perfect against thieves and spies, consequently a cryptographic coprocessor provides impediments to cracking and safeguards from theft. Also for example, processors 102-103, some portion of memory from local memories 160-163, and PCI I/O adapters 121 and 136 may be assigned to logical partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX®) operating system may be executing within partition P1, a second instance (image) of the AIX operating system may be executing within partition P2, and a Linux™ operating system may be operating within logical partition P3. AIX is a registered trademark of International Business Machines Corporation. Linux is a trademark of Linus Torvalds.

Peripheral component interconnect (PCI) host bridge 114 connected to I/O bus 112 provides an interface to PCI local bus 115. A number of PCI input/output adapters 120-121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters, that is, expansion slots for add-in connectors. Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128-129. PCI I/O adapters 128-129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141. Cryptographic coprocessor 199 is inserted in to I/O slot 197 and connects to I/O bus 112 through PCI bus 198, PCI-to-PCI bridge 142, PCI bus 141, and PCI host bridge 140.

A PCI host bridge 130 provides an interface for a PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192, also known as non-volatile RAM, connects to the ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses, as defined by Institute for Electrical and Electronics Engineers standard 1149.1, and Philips I2C busses. However, alternatively, JTAG/I2C busses 134 may be replaced by only Philips I2C busses or only JTAG/scan busses. All SP-ATTN signals of the processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I2C busses 134 to interrogate the system processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating processors 101-104, memory controller/cache 108, and I/O bridge 110. Any error information for failures detected during the BISTs, BATs, and memory tests are gathered and reported by service processor 135.

If a meaningful or valid configuration of system resources is still possible after taking out the elements found to be faulty during the BISTs, BATs, and memory tests, then data processing system 100 is allowed to proceed to load executable code into local memories 160-163. Service processor 135 then releases processors 101-104 for execution of the code loaded into local memory 160-163. While processors 101-104 are executing code from respective operating systems within data processing system 100, service processor 135 enters a mode of monitoring and reporting errors. The type of items monitored by service processor 135 includes, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and determine that this condition is predictive of a hard failure. Based on this determination, service processor 135 may mark that processor or other resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning, wherein an OS/400® operating system may exist within a partition. OS/400 is a registered trademark of International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example does not imply architectural limitations with respect to the present invention.

Figure 2:
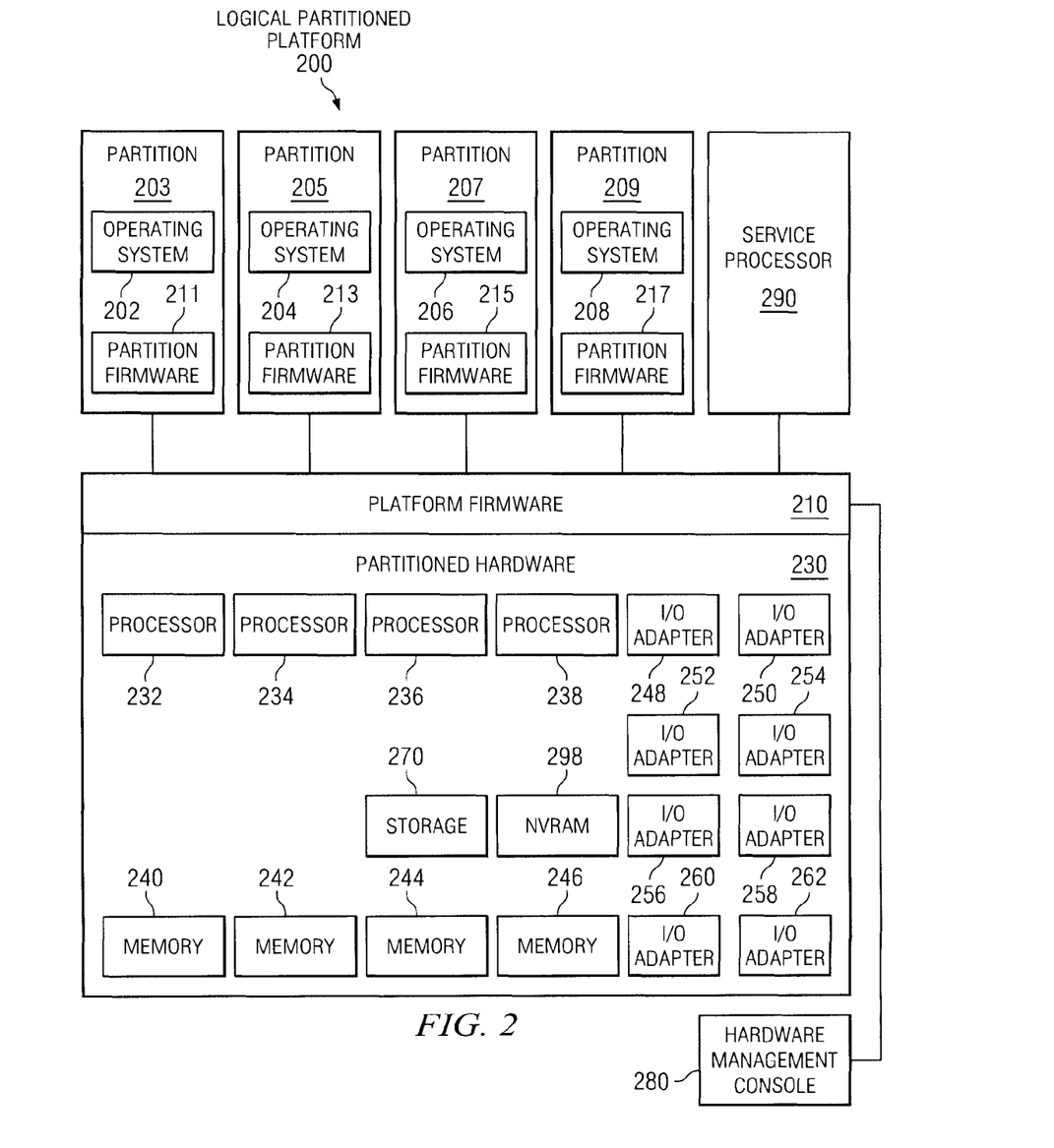
FIG. 2 is a block diagram of an exemplary logical partitioned platform in which the present invention may be implemented.

FIG. 2 shows a block diagram of an exemplary logical partitioned platform that implements an exemplary embodiment of the present invention. The hardware in logical partitioned platform 200 is, for example, data processing system 100 in FIG. 1. Logical partitioned platform 200 includes partitioned hardware 230, operating systems 202, 204, 206, 208, and partition manager or partition management firmware 210. Operating systems 202, 204, 206, and 208 may be multiple copies of a single operating system or multiple heterogeneous operating systems simultaneously run on logical partitioned platform 200. One may choose to install and run OS/400, which interfaces with a partition manager, such as hypervisor. OS/400 is only an example in these illustrative embodiments. Of course, a developer may choose to use other types of operating systems, such as AIX and Linux, depending on the particular implementation. Operating systems 202, 204, 206, and 208 are located in partitions 203, 205, 207, and 209. Hypervisor software is an example of software that implements partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). In short, a partition manager is available to a data processing system without need to access magnetic media.

Additionally, these partitions also include partition firmware 211, 213, 215, and 217. Partition firmware 211, 213, 215, and 217 may be implemented using initial bootstrap code, IEEE-1275 Standard Open Firmware, and runtime abstraction software (RTAS), which is available from International Business Machines Corporation. When partitions 203, 205, 207, and 209 are instantiated, a copy of bootstrap code is loaded onto partitions 203, 205, 207, and 209 by platform firmware 210. Thereafter, control transfers to the bootstrap code with the bootstrap code then loading the open firmware and RTAS. The processors associated or assigned to the partitions are then dispatched to the partition's memory to execute the partition firmware. It is appreciated that the partition arrangement just described is merely one way to implement an illustrative embodiment of the present invention. Other partition arrangements may also be formed within the scope of the invention.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware-implemented virtual machine identical to the underlying hardware. Thus, partition management firmware 210 allows the simultaneous execution of independent operating system images 202, 204, 206, and 208 by virtualizing all the hardware resources of logical partitioned platform 200.

Service processor 290 operates, for example, to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

Thus, the aspects of the present invention provide a computer implemented method, apparatus, and computer usable program code to execute an executable file in a protected manner. A protected manner includes inhibiting unauthorized copying of the code outside of the partition that stores the code. In addition, protection is provided against corruption of executing code while the code is in memory. A vendor's software or code is stored in a customer's partitioned data processing system such that the code is encrypted using a key. While encrypted, the code is useless despite copying, unless the one who copies also misappropriates the key. When unencrypted and executing a process, a service interface protects the code.

Figure 3:
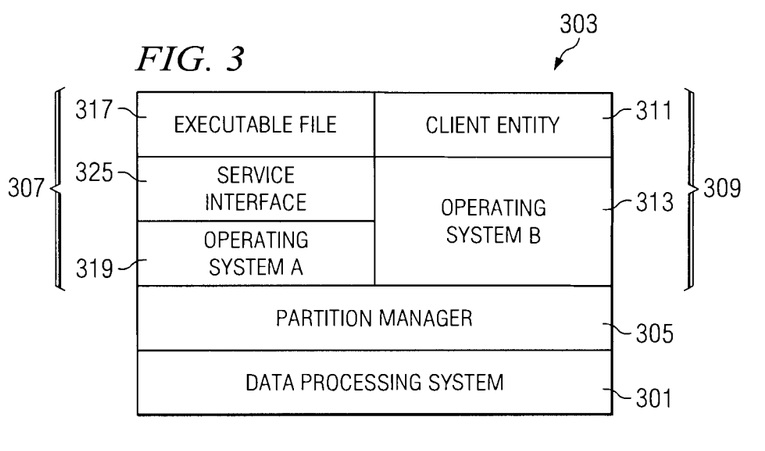
FIG. 3 shows an exemplary target partition and source partition in accordance with an illustrative embodiment of the present invention.

FIG. 3 shows an exemplary target partition and source partition in accordance with an illustrative embodiment of the present invention. FIG. 3 shows various software components that operate on the resources of data processing system 301. Collectively, the hardware and software components are partitioned environment 303. The data processing system is, for example, data processing system 100 of FIG. 1. Partition manager 305 apportions the data processing system among the two or more partitions. Data processing system 301 includes hardware under the direct control of operating system B 313 and hardware under the direct control of operating system A 319. To the extent operating system A 319 determines that processes of operating system B 313 are authorized, operating system A 319 may manipulate its hardware in coordination with operating system B 313. Partition manager 305, for example, a hypervisor, allocates resources to two or more partitions. Partition manager 305 creates target partition 307 and source partition 309. Client entity 311 may be a program owned or controlled by a software consumer or client entity. An entity is any executing software for which a partition allocates a resource of source partition 309. An entity is, for example, a command line editor.

Client entity 311 operates in accordance with the limitations and features of operating system B 313. Operating system B 313 is an operating system, such as, for example, Linux. An operating system is the system software responsible for the direct control and management of hardware and basic system operations. Additionally, the operating system provides a foundation upon which to run application software such as word processing programs and web browsers.

Service interface 325 operates as a gatekeeper to any entities outside target partition 307, controlling which entity has access to particular resources within. A service interface is a software component that authenticates commands and communications external to the partition, and limits inbound commands and communications as well as controls decryption of data stored within the partition. The service interface is part of an operating system running within a partition. Service interface 325 may be a part of an operating system, for example, operating system 202 of FIG. 2.

Operating system A 319 allows executing files or processes of target partition 307 basic features of an operating system, for example, Linux. Executable file 317 is a set of instructions, interpreted or compiled, that may run on target partition 307. Executable file 317 may include code objects that include both instructions and memory for variables, arrays, and other data structures. A process is an executing instance of an executable file, which may operate on a processor in a time-shared manner. A process may have a process identifier and communication ports whereby data may be passed into and out from the instance.

Figure 4:
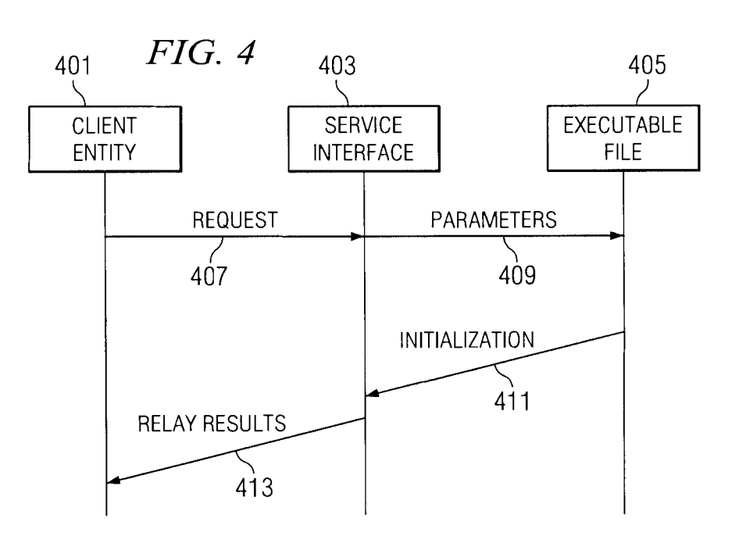
FIG. 4 shows communication between a client entity and an executable file in accordance with an illustrative embodiment of the present invention.

FIG. 4 shows communication between a client entity and an executable file in accordance with an illustrative embodiment of the present invention. Client entity 401 needs to operate a function provided by protected software, for example, protected executable file 405. An executable file is a file that includes machine instructions suited to a processor allocated to the same partition within which the executable file is stored. A protected executable file is a file that includes machine instructions. Such machine instructions, when in a decrypted state, are suited to run on a processor allocated to the same partition within which the protected executable file is stored.

Client entity 401 initiates a request to execute that invokes the function. A request to execute is a request that identifies an executable file at least sufficiently that an operating system or partition manager may identify source code in order to establish an executing instance of the executable code. A request to execute is, for example, request 407, a set of data provided to service interface 403. The request is, for example, a request to access a target partition resource. The set of data identifies protected executable file 405 or source of the executable file, and includes a key that authenticates client entity 401 with a key stored within a target partition. Request 407 may include parameters upon which the function will operate. Authentication is a process wherein a device or person shares a common parameter with a second device or person. Authentication includes a confirmation step that a device or person purporting to be the second device or person has the parameter.

Service interface 403 forwards parameters 409 if the determination is positive. Based on that case, service interface provides parameters 409 either as a data structure or a message to protected executable file 405. A process may create protected executable file 405 on an ad hoc basis when authentication is correct.

Protected executable file 405 may provide an initialization confirmation by sending confirmation 411 to service interface 403. Service interface 403 may await any responsive communication from protected executable file 405. Service interface may dispatch one or more relay results 413 to client entity 401. Additional inter-process and other communications may pass between client entity 401 and protected executable file 405 following service interface 403 receiving confirmation 411.

Figure 5:
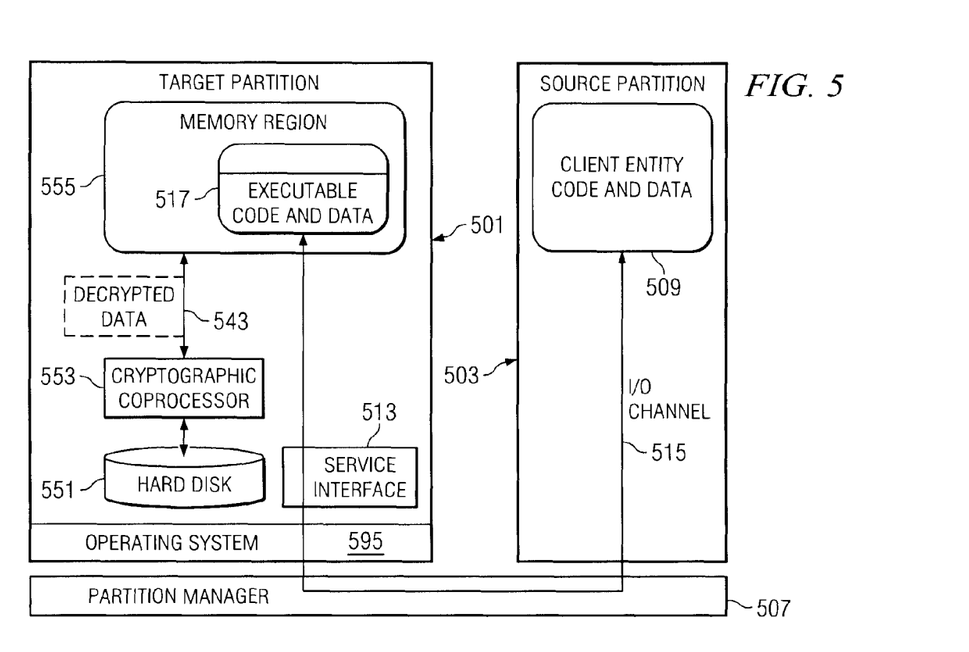
FIG. 5 shows the data path through two partitions in accordance with an illustrative embodiment of the present invention.

FIG. 5 shows the data path through two partitions in accordance with an illustrative embodiment of the present invention. FIG. 5 shows the executable file's origin and the executable file's execution location as within target partition 501. It is appreciated that any attack from within source partition 503 would be thwarted by an illustrative embodiment of the present invention.

A target partition is a partition that includes a cryptographic coprocessor or a mechanism to protect cryptographic keys and perform cryptographic functions. A source partition is any partition that is not a particular target partition. Thus, a source partition is only a source partition relative to a particular target partition. A target partition may be a source partition, in relation to a second target partition. Target partition 501 is, for example, partition 203 of FIG. 2. Source partition 503 is, for example, partition 205 of FIG. 2.

Service interface 513 controls hard disk 551 and cryptographic coprocessor 553. Service interface 513 may rely on operating system 595 to mediate hard disk 551 accesses. Hard disk 551 is, for example, hard disk 150 of FIG. 1. Cryptographic coprocessor 553 is, for example, cryptographic coprocessor 199 of FIG. 1. Service interface 513 is, for example, service interface 325 of FIG. 3. Executable code and data 517 includes, for example, protected executable file 405 of FIG. 4. Executable code and data 517 may originate from an encrypted file stored on hard disk 551. Executable code and data 517 persists in a form later written as decrypted data 543 to memory region 555. Memory region 555 is, for example, memory allocated from one or more local memories 160-163 of FIG. 1. Service interface 513 mediates inter-process communications between client entity code and data 509 and executable code and data 517. Such mediation includes, for example, forming a communication channel, for example, I/O channel 515. A communication channel is a hypervisor controlled mechanism for moving data between partitions in a controlled manner. An illustrative embodiment of the present invention includes a hypervisor copying data from one partition memory to a second partition memory. Such memory copying occurs provided a hypervisor has sufficient resources to allocate to this operation. The hypervisor may mediate the memory accesses and limit the amounts copied to the space allocated.

A memory access is a write to or a read from memory. A request to access a memory region is one or more instructions to write or read from memory. Memory access, for example, buffer writes, may employ a low-level function of partition manager 507. Partition manager 507 limits direct buffer writes only to memory in the same partition as an executing program is stored. For example, memory written by a buffer write controlled by client entity code and data 509 is limited to memory up to a memory boundary. A memory boundary is a limit of the extent of a memory allocated to a partition. In some cases, a memory boundary ends at a memory region. A memory boundary may be an end to a contiguous range of memory within one or more local memories. Such a range may be stored to memory, wherein the memory access is controlled by a partition manager.

Figure 6:
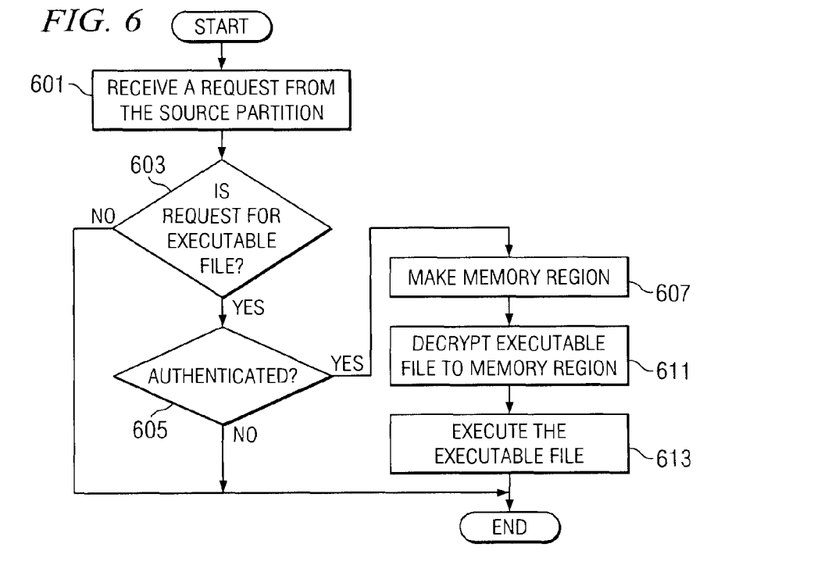
FIG. 6 shows the steps to make an executable file of the target partition accessible in accordance with an illustrative embodiment of the present invention.

FIG. 6 shows the steps to make an executable file of the target partition accessible in accordance with an illustrative embodiment of the present invention. A process, operating as part of a service interface, executes the steps of FIG. 6. The service interface is, for example, service interface 513 of FIG. 5. The process receives a request from the source partition (step 601). The process determines if the request is for an executable file (step 603). The executable file may exist as a source file or an encrypted file stored to a hard disk, for example, hard disk 551 of FIG. 5. Based on a positive determination, the process attempts to authenticate the request (step 605). A positive match between a key in the request and a key accessed through a cryptographic processor causes the process to take a positive branch from step 605. A positive match is a positive determination of the authentication determination. The cryptographic coprocessor is, for example, cryptographic coprocessor 553 of FIG. 5. The process makes a memory region (step 607). The memory region may be, for example, a RAM disk. The RAM disk is a data structure resembling a file system which governs allocation and housekeeping functions. A memory region may be created in a three step process for a process running on a Linux system. Table 1 describes a script of three commands and associated comments to create an exemplary memory region in accordance with an illustrative embodiment of the present invention.

TABLE 1 create a mount point:
mkdir /tmp/ramdisk0
create a filesystem:
mke2fs /dev/ram0
mount the ramdisk:
mount /dev/ram0 /tmp/ramdisk0

Using a cryptographic coprocessor, the process decrypts the source of the executable file to a memory region, for example, a ram disk (step 611). The cryptographic coprocessor provides physical and logical safeguards to keep unique cryptographic keys used for content protection. Step 611 employs a unique cryptographic key to decrypt the source of the executable file. The ram disk is, for example, memory region 555 of FIG. 5. The process executes the executable file, assigning a portion of the ram disk and other resources of the target partition to the executable file (step 613). Executing the executable file may include creating a session wherein the process assigns a process identifier or process ID to the running instance of the executable file. In addition, executing the executable file may include creating a communication channel between the session and the client entity. When the executable file completes execution, the process terminates thereafter.

A negative determination is an authentication determination, wherein there is no match between a key in the request and a key accessed through a cryptographic processor. Such a determination occurs at step 605, where, for example, a second entity, not authorized, interacts with a process to execute the steps of FIG. 6 following the operation of FIG. 6 in response to a properly authorized first entity. A negative determination at step 605 effectively denies the request because the process terminates after the negative determination. By terminating, the process prevents execution of steps 607, 611, and 613 by the unauthorized second entity.

Thus, the aspects of the present invention provide a computer implemented method, apparatus, and computer usable program code to execute an executable file in a protected manner. A vendor's software or code is stored in a customer's partitioned data processing system such that the code is encrypted using a key. The key is stored in the cryptographic coprocessor, thus regulating access to those persons and processes that are authorized. While encrypted, the code is useless despite copying, unless the one who copies also misappropriates the key. When unencrypted and executing as a process, the service interface protects the code.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be a storage medium such as an electronic, magnetic, optical, electromagnetic, infrared, or semiconductor system (or apparatus or device) or a propagation medium. Examples of a computer-readable storage medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for executing an executable file associated with a target partition, comprising:

receiving, by a computer, a request to execute the executable file from an entity running within a source partition;

creating, by the computer, a memory region within the target partition, in response to receiving the request;

making an authentication determination, by the computer, in response to receiving the request;

executing the executable file, by the computer, in the memory region within the target partition based on the request if the authentication determination is a positive determination, wherein the request is also a request to access a target partition resource maintained within the target partition;

authenticating, by the computer, the request from the entity, wherein the creating is responsive to the authenticating;

responsive to authenticating the request, decrypting, by the computer, the executable file to the memory region within the target partition, wherein the executable file is stored to a storage associated with the target partition;

receiving, by the computer, a second request to execute the executable file from a second entity running within the source partition;

making, by the computer, a second authentication determination in response to receiving the second request; and denying, by the computer, the second request if the second authentication determination is a negative determination.

2. The computer implemented method of claim 1, wherein execution of the file forms a process and further comprising:

setting up, by the computer, a communication channel between the process and the entity.

3. A computer program product comprising a non-transitory computer usable storage medium having computer usable program code stored thereon for executing an executable file associated with a target partition, the computer program product including;

computer usable program code for receiving a request to execute the executable file from an entity running within a source partition;

computer usable program code for, responsive to receiving the request, creating a memory region within the target partition;

computer usable program code for making an authentication determination in response to receiving the request;

computer usable program code for executing the executable file in the memory region within the target partition based on the request if the authentication determination is a positive determination, wherein the request is also a request to access a target partition resource maintained within the target partition;

computer usable program code for authenticating the request from the entity, wherein the creating is responsive to the authenticating;

computer usable program code for responsive to authenticating the request, decrypting the executable file to the memory region within the target partition, wherein the executable file is stored to a storage associated with the target partition;

computer usable program code for receiving a second request to execute the executable file from a second entity running within the source partition;

computer usable program code for making a second authentication determination in response to receiving the second request; and computer usable program code for denying the second request if the second authentication determination is a negative determination.

4. The computer program product of claim 3, wherein execution of the file forms a process and further comprising:

computer usable program code for setting up a communication channel between the process and the entity.

5. A data processing system comprising:

a hardware bus;

a storage device connected to the bus, wherein computer usable code is located in the storage device;

a hardware communication unit connected to the bus;

a hardware processing unit connected to the bus, wherein the processing unit executes the computer usable code to execute an executable file associated with a target partition, the processing unit further executes the computer usable code to: receive a request to execute the executable file from an entity running within a source partition; create a memory region within the target partition, responsive to receiving the request; make an authentication determination in response to receiving the request; execute the executable file in the memory region within the target partition based on the request if the authentication determination is a positive determination, wherein the request is also a request to access a target partition resource maintained within the target partition; authenticate the request from the entity, wherein the processing unit executes the computer usable code to create responsive to executing the computer usable code to authenticate; decrypt the executable file to the memory region within the target partition, responsive to executing the computer usable code to authenticate the request, wherein the executable file is stored to a storage associated with the target partition; receive a second request to execute the executable file from a second entity running within the source partition; make a second authentication determination in response to receiving the second request; and deny the second request if the second authentication determination is a negative determination.

6. The data processing system of claim 5, wherein execution of the file forms a process and the processing unit further executes the computer usable code to set up a communication channel between the process and the entity.

* * * * *